(12) United States Patent
Cazzoli

(10) Patent No.: US 8,454,827 B1
(45) Date of Patent: Jun. 4, 2013

(54) FILTER FOR EDIBLE OIL AND FAT

(76) Inventor: Fernando Luis Pereira Cazzoli, Campinas (BR)

( * ) Notice: Subject to any disclaimer, the term of this patent is extended or adjusted under 35 U.S.C. 154(b) by 0 days.

(21) Appl. No.: 13/566,689

(22) Filed: Aug. 3, 2012

(51) Int. Cl.
*B01D 35/26* (2006.01)
*A47J 37/12* (2006.01)
*A47J 43/28* (2006.01)

(52) U.S. Cl.
USPC ..... 210/238; 210/241; 210/416.1; 210/416.5; 210/94; 210/167.28

(58) Field of Classification Search
USPC ......... 210/238, 94, 241, 416.1, 416.5, 167.28
See application file for complete search history.

(56) References Cited

U.S. PATENT DOCUMENTS

| | | | | | |
|---|---|---|---|---|---|
| 3,356,218 | A | * | 12/1967 | Grudoski | 210/167.28 |
| 3,415,181 | A | * | 12/1968 | Hart | 99/408 |
| 3,447,685 | A | * | 6/1969 | Bircher | 210/167.28 |
| 3,735,871 | A | * | 5/1973 | Bisko | 210/167.28 |
| 5,681,466 | A | * | 10/1997 | Goldberg et al. | 210/350 |
| 5,951,854 | A | * | 9/1999 | Goldberg et al. | 210/85 |
| 7,052,605 | B2 | * | 5/2006 | Posavac et al. | 210/238 |

* cited by examiner

*Primary Examiner* — Thomas M Lithgow
(74) *Attorney, Agent, or Firm* — Dennis R. Haszko

(57) ABSTRACT

A filter for edible oil and fat designed to increase the useful life of oil and fat used for frying foodstuff and to improve the quality thereof, having reduced shape and dimensions, thus allowing to be immersed in the oil to be filtered, thus eliminating the time spent for removing and conveying the hot oil compared to the traditional filtering methods and making the process safer; the shorter time reducing the loss of heat, thus keeping the oil hot and the viscosity low and thus facilitating the passage thereof through filtering element.

8 Claims, 8 Drawing Sheets

FILTER FOR EDIBLE OIL AND FAT

FIELD OF THE INVENTION

The present invention refers to filter for edible oil and fat, pertaining to the foodstuff field, and is directed more particularly to a filtering device to be used in snack bars, restaurants, pastry shops, etc. designed to both increase the useful life of oil and fat used for frying foodstuff and improve the quality thereof. In the present disclosure, both edible oils and edible fats will be simply called oil for the sake of simplicity.

BACKGROUND OF THE INVENTION

The large scale use of oil in the frying process in snack bars, restaurants, pastry shops, etc. is widely known and, for this reason, there a need to extend the use of the oil and assure the quality of same and foodstuff as well.

As an example of the state of the art, mention is made to patent application U.S. Pat. No. 7,052,605 of Oct. 5, 2001, that discloses a liquid purifying device that also can be used for oils. The device is composed of three parts that are assembled at the time it is used and provided with two inner filtering chambers. The device pumps the oil into a pre-chamber wherein a pre-filtering step is carried out for the purpose of separating solids, and then the oil is transferred to the second chamber wherein a second filtering step is carried out, and finally returned to an oil tub/vat, thus exposing the liquid partially above the oil level.

However, said filter presents a number of drawbacks, viz:
- a bad quality filtering action due to deficiency of the filter;
- exposure of the oil at the time it is returned after the filtering process;
- need to assemble the three parts so that it is able to operate;
- need to perform a pre-filtering step for retaining higher particulates in view of the deficiency of the paper filter of the second step that is more suited to retain fine particulates.

Therefore, one of the objects of the present invention is to provide a robust easy-to-clean portable filtering device. It can be handled quite simply, automatically, and requires very little intervention by the operator.

SUMMARY OF THE INVENTION

The present invention provides a filter for edible oil and fat which, in view of its reduced shape and dimensions, allows same to be immersed in the oil to be filtered, thus eliminating the time spent for removing and conveying the hot oil compared to the traditional filtering methods. This will reduce the filtering time and make the process safer. This shorter time will reduce the loss of heat, thus keeping the oil hot, which is a relevant factor in a filtering process, since the viscosity of the oil is kept low and thus it facilitates the passage thereof through the filtering element.

The present invention seeks to provide a filter for edible oil and fat designed to increase the useful life of oil and fat. The filter comprises (a) a shielded cylindrical structure having a lower and a higher section; (b) a top cover provided at the higher section; (c) a transmission axle propelled by an electric engine encased in the top cover and which is provided at the higher sections; the transmission axle is attached to the higher and low section through sealed oil retainers; (d) a flange adjacent to an upper part of the lower section, the flange provided with multiple openings; (e) a bottom cover attached to a lower part of said lower section, the cover defining a central opening. The filter further comprising (f) an assembly comprising a rotor encased in the bottom cover and connected to a lower end of the transmission axle, the rotor provided with multiple tabs; the assembly operating as a centrifugal pump; (g) a housing and a stopper, supported by flange, and provided with a see-through opening element with an attachment system; defining a single chamber, and (h) a filtering element attached to an internal side of said opening element.

BRIEF DESCRIPTION OF THE DRAWINGS

The filter for edible oil and fats will be better understood through the figures that show schematically.

DETAILED DESCRIPTION OF THE INVENTION

Figure 1:
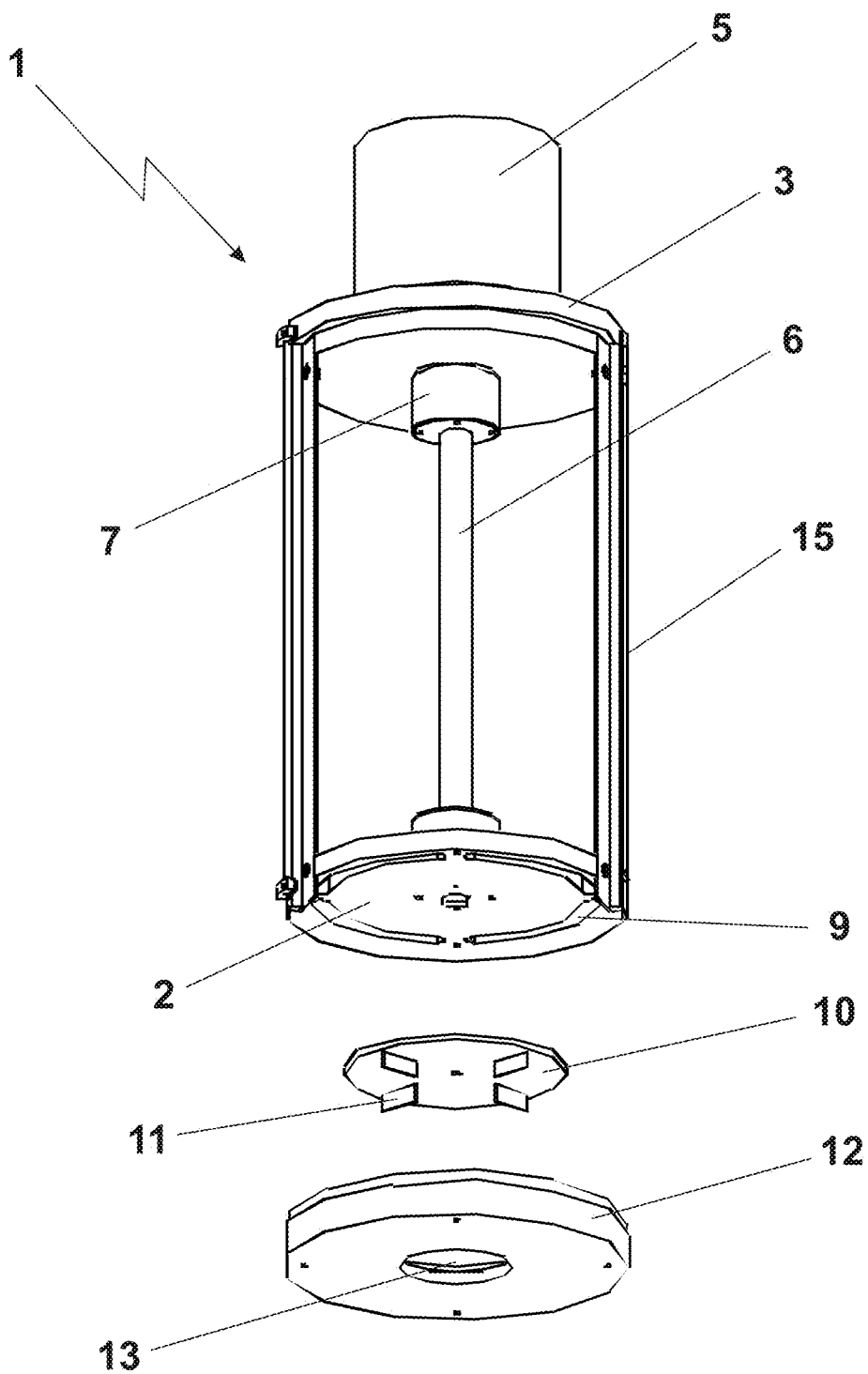
FIG. 1—a perspective exploded view of the parts of the filter for edible oil and fat without the door and the filter, seen from below.
Figure 2:
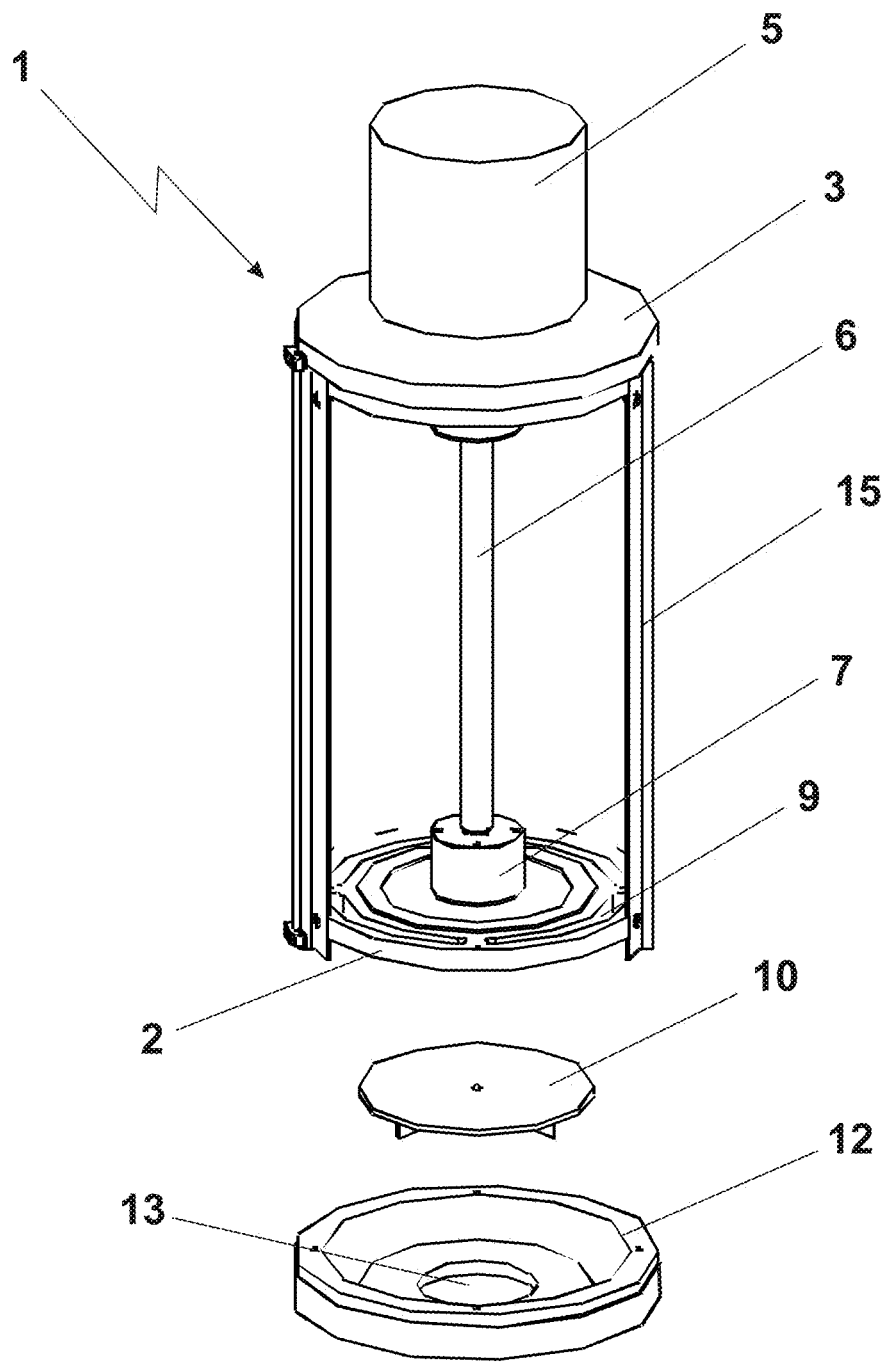
FIG. 2—a perspective exploded view of the parts of the filter for edible oil and fat without the door and the filter, seen from above.
Figure 3:
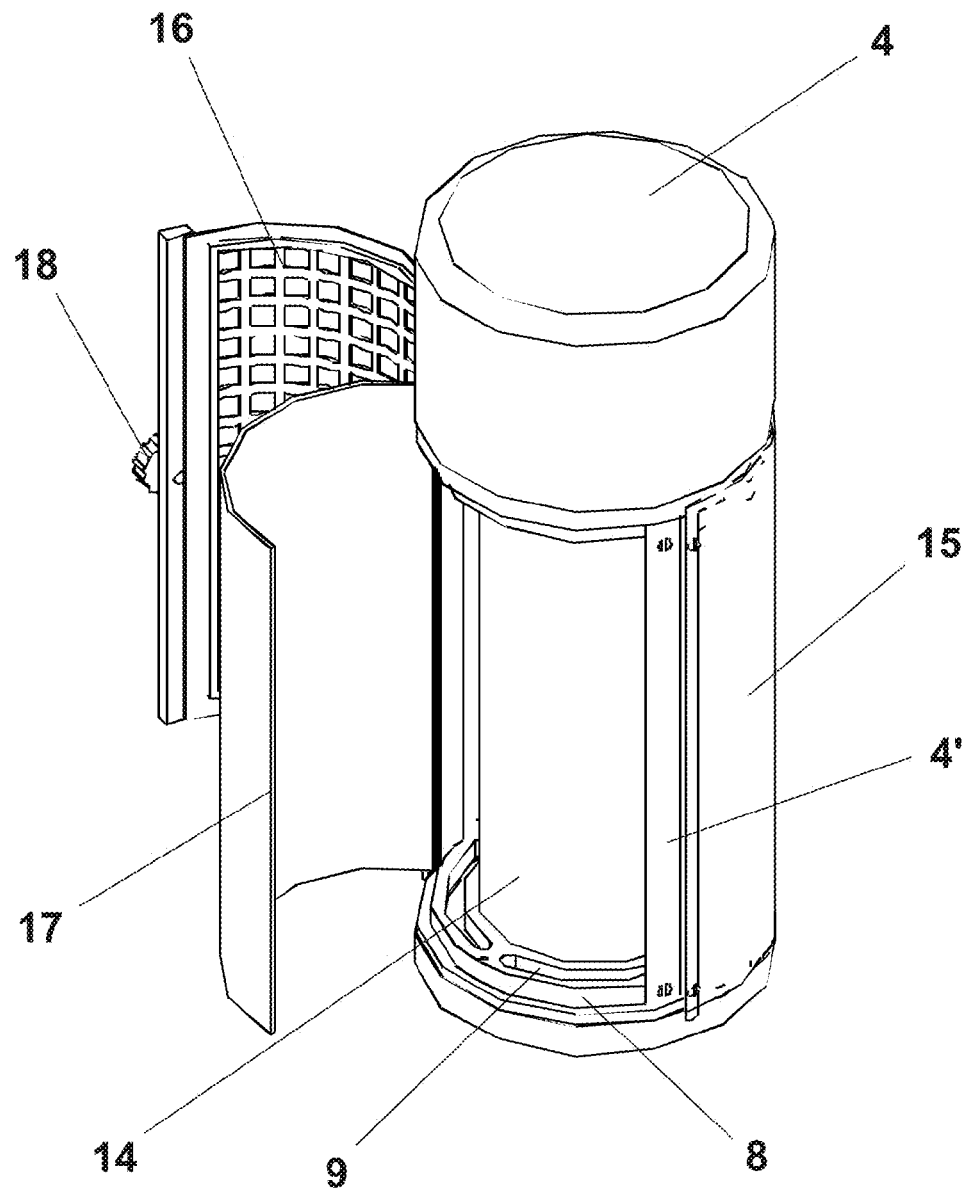
FIG. 3—a perspective view of the filter for edible oil and fat with the outer enclosure and the outer door open.
Figure 4:
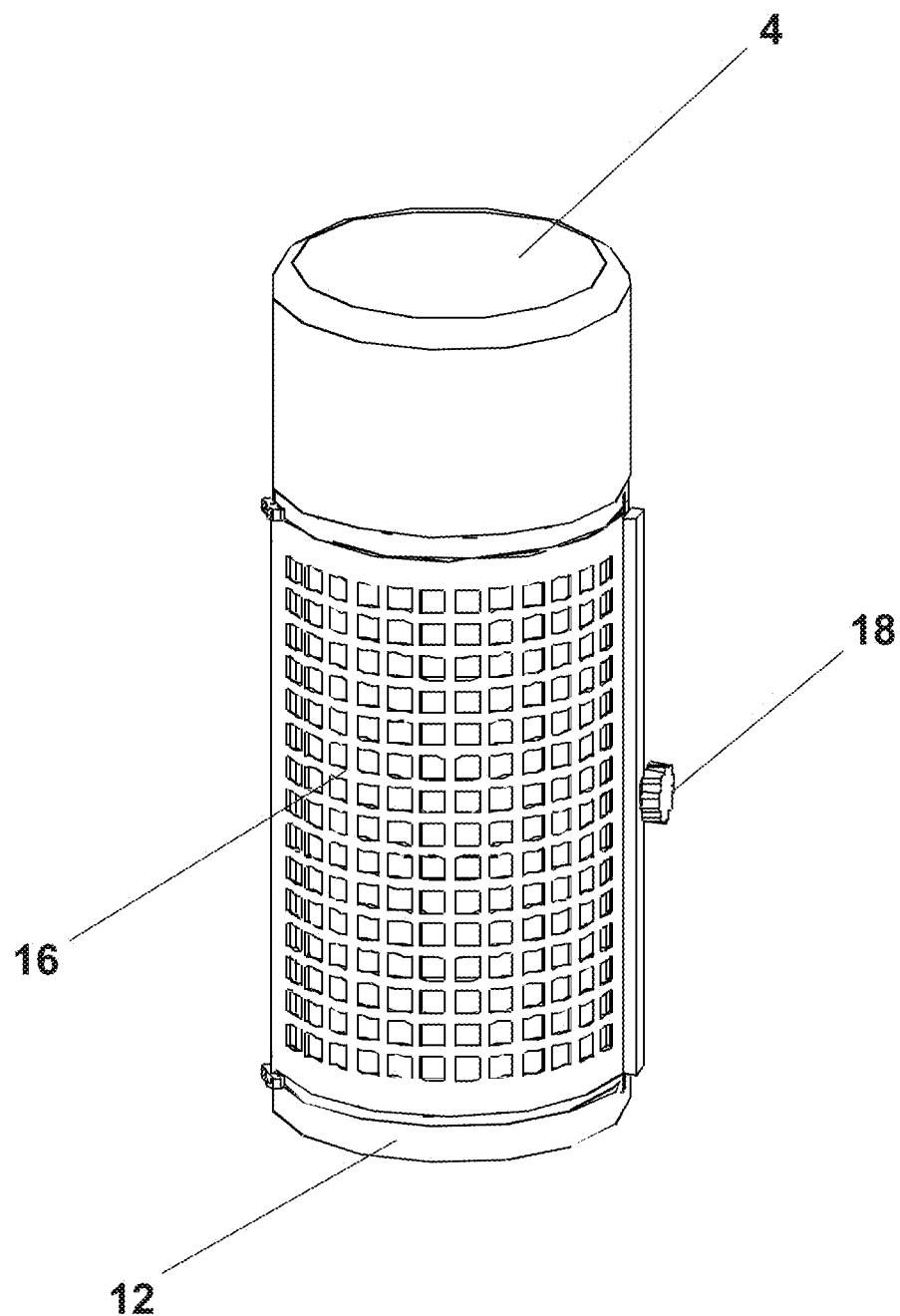
FIG. 4—a perspective view of the filter for edible oil and fat with the outer enclosure and the outer door closed.
Figure 5:
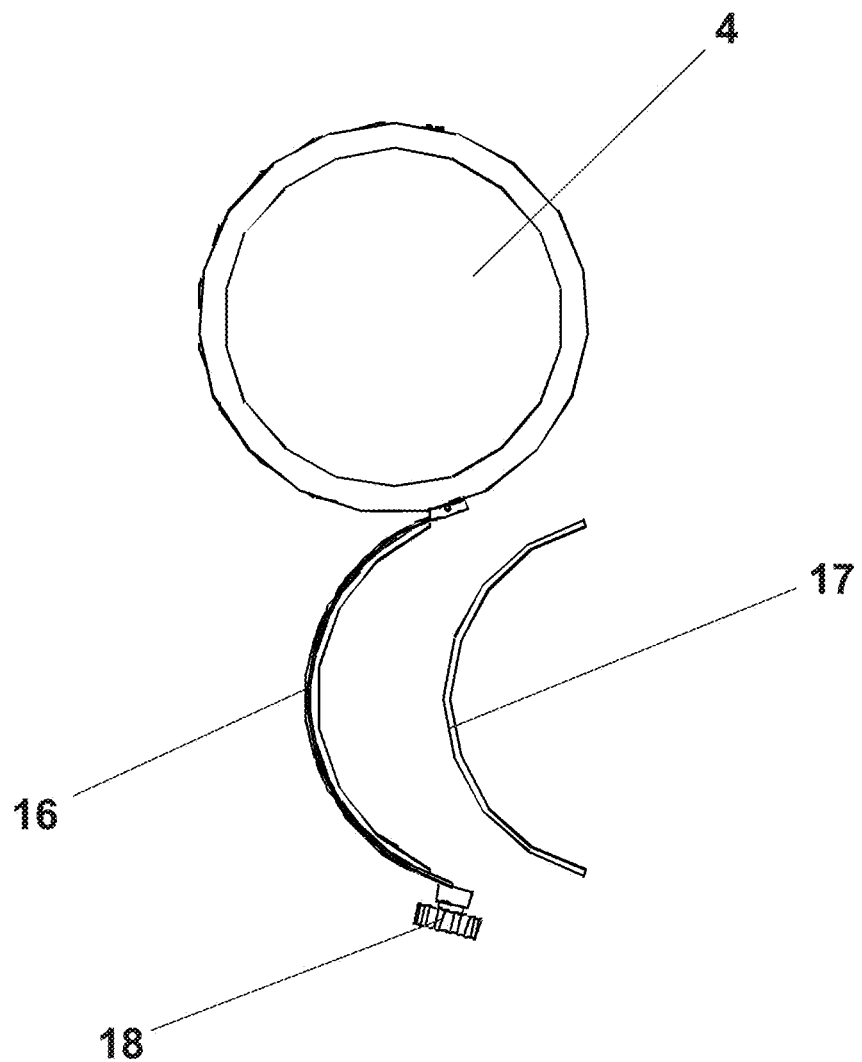
FIG. 5—a top view of the filter for edible oil and fat with the filtering element exploded.

According to FIGS. 1 through 5, in the filter for edible oil and fat, all the parts of which that are put in direct contact with the eatable oil are made of a suitable non-ferrous material. The filter comprises a cylindrical structure (1) whose parts are shielded, that is composed of a lower section (2) and a higher section (3) that are joined by a transmission axle (6) propelled by an electric engine (5) provided at the higher section (3). The transmission axle (6) encased in a top cover (4) provided at the higher section (3), and that is provided with operating LEDs. The transmission axle (6) is supported on the assembly attached to the higher section (3) and to the lower section (2) through sealed oil retainers (7). The upper periphery of said lower section (2) is provided with a flange (8) that is provided with openings (9), and the lower face thereof is provided with a bottom cover (12) attached to a lower part of the lower section (2), the cover defining a central opening (13). An assembly comprising a rotor (10) is encased in the bottom cover (12) and is also connected to a lower end of the transmission axle (6), which on its turn is provided with tabs (11). The assembly forming and operating as a centrifugal pump.

A housing (14) and a stopper (15), are supported by flange (8) adjacent to an upper part of said lower section (2), which encloses the whole structure of the filter, thus forming a single chamber, and is provided with a door having see-through elements (16) to which the filtering element (17) is attached and that on its turn is provided with an attachment system (18), that may be provided through a screw pin, a pressure-closing device or a vertical locking device.

Said filtering element (17) is formed by a matrix of cellulose and active carbon.

Figure 6:
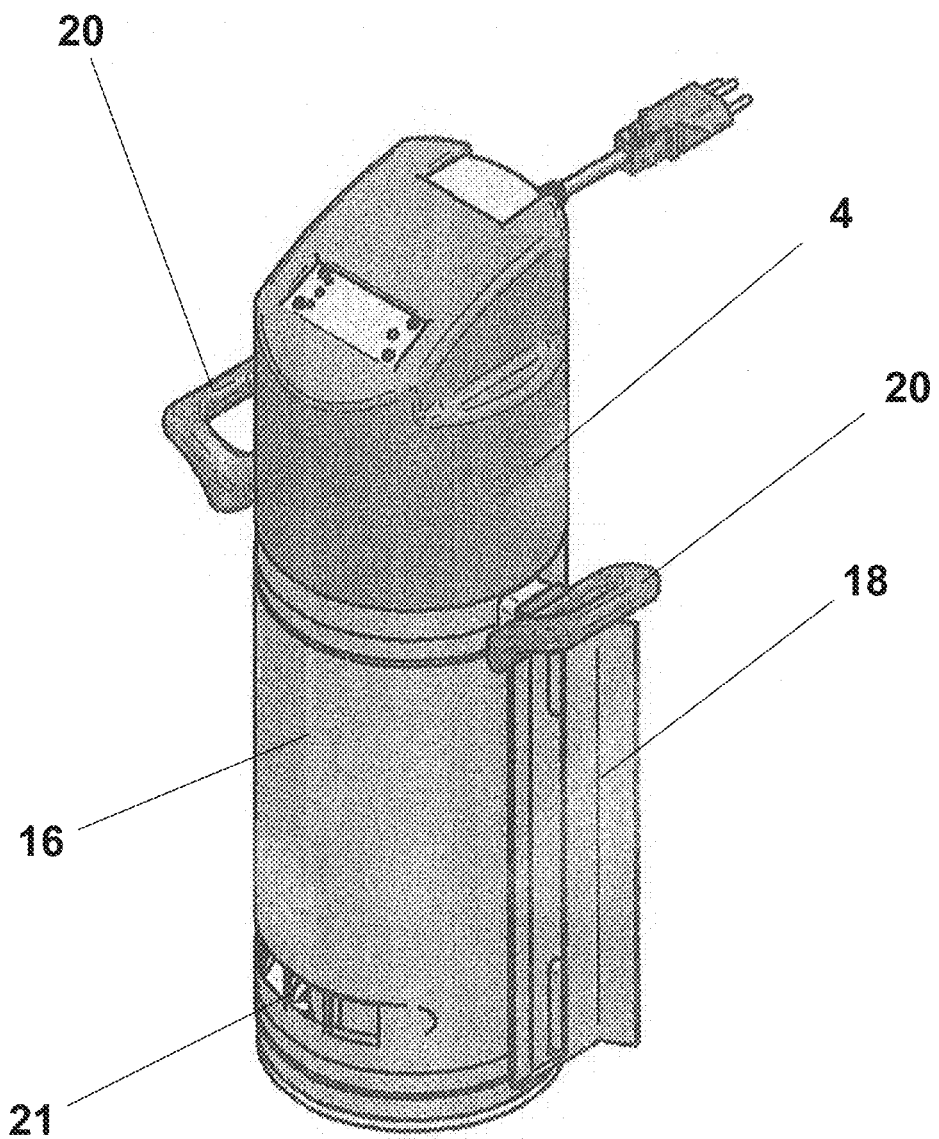
FIG. 6—a perspective view of a variation of the filter for edible oil and fat with handles and the outer door only with a lower opening.
Figure 7:
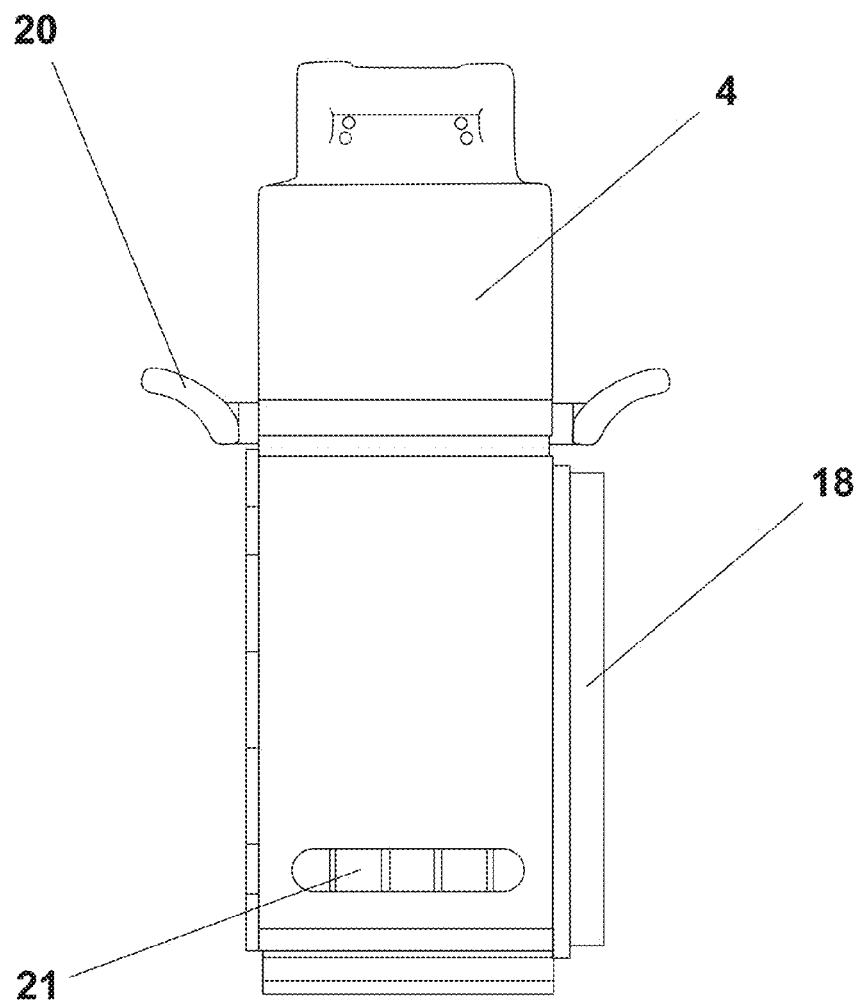
FIG. 7—a front view of the variation of the filter for edible oil and fat.
Figure 8:
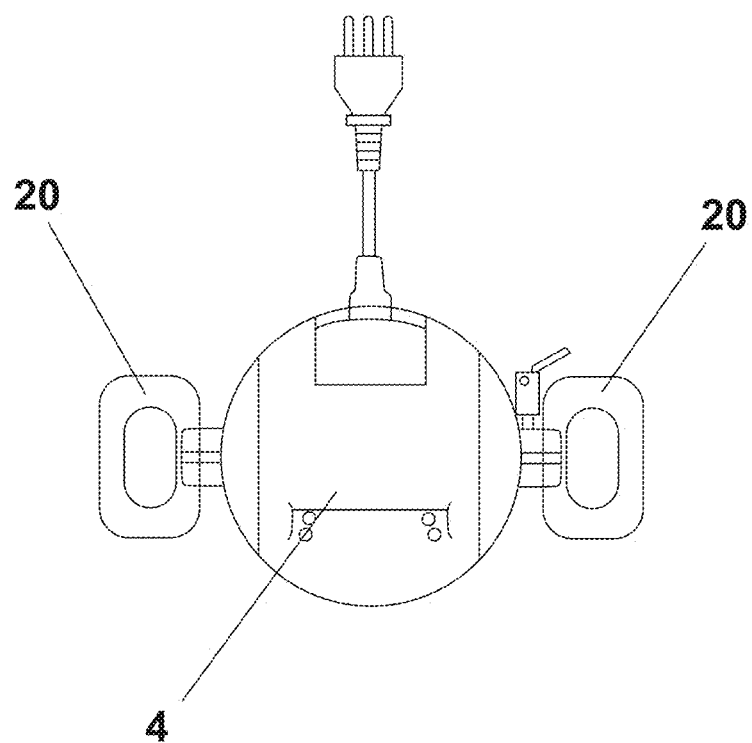
FIG. 8—a top view of the filter for edible oil and fat.

Optionally, according to FIGS. 6 through 8, the filter for edible oil and fat can be provided with fixed handles (20) attached to the upper part of the stopper (15), and see-through opening element (16) is closed when in operation. The see-through opening element (16) is also provided with an opening (21) thus remaining the opening (21) for draining the oil or fat filtered.

The filter for edible oil and fat is operated when the electric engine (5) propels rotor (10) rotating through the transmission axle (6). This rotation of the rotor (10) transfers kinetic energy to the oil through the tabs (11). The oil or fat being filtrated is sucked through a central opening (13) defined by the cover (12), and then it flows towards the inner space formed by the cover (12) and the lower section (2) through the channels formed between the tabs (11). The oil leaves said space with a considerable absolute speed and kinetic energy that is converted into potential compressive energy by the cover (12) and the lower section (2), according to Bernoulli's principle. The oil under pressure passes through the openings (9) and reaches the compartment formed by the housing (14), the stopper (15), the higher section (3) and the assembly formed by the filtering element (17) and the opening element (16). The oil under pressure flows towards the outer region through the filtering element (17), in accordance with the filtering characteristics thereof, in a cyclical circulation process, and the filtered oil returns to the vat.

Thus, the filter for edible oil and fat provides the following extraordinary advantages in relation to the state of the art:
- prevents the early loss of the oil, thus providing cost savings in view of the extended useful life of the oil, and improves the quality thereof as well;
- makes same easy to clean and use;
- provides a better quality and efficiency in the filtering process through the use of a filter composed of a matrix of cellulose and active carbon;
- is provided with only one inner chamber, thus not requiring any extra chambers and pre-filtering steps;
- allows a deep filtering action, by retaining particulate material up to 0.5 micron besides adsorbing all the excessive color, odor and flavor formed during the frying process;
- provides an exit for the oil filtered in the lower portion of the door that remains submerged in the oil during the filtering process; and
- is cost-effective.

The scope of the present invention should not be limited to either the accompanying figures or the applications of the object, but to the terms defined in the claims and the equivalents thereof.

The invention claimed is:

1. A filter for edible oil and fat, comprising:
   (a) a shielded cylindrical structure (1) having a lower section (2) and a higher section (3);
   (b) a top cover (4) provided at said higher section (3);
   (c) a transmission axle (6) propelled by an electric engine (5) provided at said higher section (3) and encased in said top cover (4); said transmission axle (6) attached to said higher section (3) and to said lower section (2) through sealed oil retainers (7);
   (d) a flange (8) adjacent to an upper part of said lower section (2), the flange provided with multiple openings (9);
   (e) a bottom cover (12) attached to a lower part of said lower section (2), the cover defining a central opening (13);
   (f) an assembly comprising a rotor (10) encased in said bottom cover (12) and connected to a lower end of said transmission axle (6), the rotor provided with multiple tabs (11); the assembly operating as a centrifugal pump;
   (g) a housing (14) and a stopper (15), supported by flange (8), and provided with a see-through opening element (16) with an attachment system (18); defining a single chamber, and
   (h) a filtering element (17) attached to an internal side of said opening element (16).

2. The filter for edible oil and fat according to claim 1, further provided with fixed handles (20) attached to an upper part of said stopper (15).

3. The filter for edible oil and fat according to claim 1, wherein the attachment system (18) further comprising a screw pin and a pressure-closing device or a vertical lock.

4. The filter for edible oil and fat according to claim 1, wherein the filtering element (17) is of a matrix of cellulose and active carbon.

5. The filter for edible oil and fat according to claim 1, wherein all parts in direct contact with said edible oil or fat are made of a suitable non-ferrous material.

6. The filter for edible oil and fat according to claim 1, wherein said cover (4) is provided with operating LEDs.

7. The filter for edible oil and fat according to claim 1, wherein when in operation said see-through opening element (16) is closed.

8. The filter for edible oil and fat according to claim 1, further provided with an opening (21) on said see-through opening element (16) for draining the oil or fat filtered.

* * * * *